United States Patent
Beskrovny et al.

(10) Patent No.: US 9,390,269 B2
(45) Date of Patent: *Jul. 12, 2016

(54) SECURITY TESTING USING SEMANTIC MODELING

(71) Applicant: GLOBALFOUNDRIES INC., Grand Cayman (KY)

(72) Inventors: Evgeny Beskrovny, Ramat Gan (IL); Alexander Landa, Haifa (IL); Omer Tripp, Bronx, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 95 days.

This patent is subject to a terminal disclaimer.

(21) Appl. No.: 14/041,010

(22) Filed: Sep. 30, 2013

(65) Prior Publication Data

US 2015/0096033 A1 Apr. 2, 2015

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *H04L 29/06* | (2006.01) |

(Continued)

(52) U.S. Cl.
CPC .......... *G06F 21/577* (2013.01); *H04L 63/1433* (2013.01); *G06F 11/3668* (2013.01); *G06F 11/3672* (2013.01); *H04L 41/28* (2013.01)

(58) Field of Classification Search
CPC .............. G06F 21/577; G06F 11/3668; G06F 11/3672; H04L 41/28; H04L 63/1433

USPC ............................................. 726/25; 713/151
See application file for complete search history.

(56) References Cited

U.S. PATENT DOCUMENTS

| | | | | |
|---|---|---|---|---|
| 7,013,395 | B1 * | 3/2006 | Swiler et al. | 726/25 |
| 7,096,502 | B1 * | 8/2006 | Fox et al. | 726/25 |
| 7,603,461 | B2 * | 10/2009 | Crosby | H04L 63/1408 709/224 |

(Continued)

FOREIGN PATENT DOCUMENTS

| | | |
|---|---|---|
| CN | 101442412 A | 5/2009 |
| CN | 101551842 A | 10/2009 |

(Continued)

OTHER PUBLICATIONS

Bau et al., "State of the Art: Automated Black-Box Web Application Vulnerability Testing", IEEE Symposium on Security and Privacy, 2010, pp. 332-345.

(Continued)

*Primary Examiner* — Jayesh Jhaveri
(74) *Attorney, Agent, or Firm* — Michael J. LeStrange, Esq.

(57) ABSTRACT

Optimized testing of vulnerabilities in an application implemented by a method includes generating a first probe directed to determine whether an application is vulnerable to a first type of attack; analyzing one or more responses from the application based on the application responding to the first probe; in response to determining that the one or more responses from the application validate a first hypothesis about one or more vulnerabilities associated with the application, and generating at least a second probe to further verify the first hypothesis. The second probe focuses on discovering additional details about the application's vulnerabilities to the first type of attack or a second type of attack.

6 Claims, 4 Drawing Sheets

(51) Int. Cl.
  *G06F 11/36* (2006.01)
  *H04L 12/24* (2006.01)

(56) References Cited

U.S. PATENT DOCUMENTS

| | | | | |
|---|---|---|---|---|
| 7,818,797 | B1* | 10/2010 | Fan | G06F 21/55 726/22 |
| 8,468,244 | B2* | 6/2013 | Redlich | G06Q 10/06 705/50 |
| 8,789,187 | B1* | 7/2014 | Pennington | G06F 11/3672 726/22 |
| 2003/0070003 | A1* | 4/2003 | Chong et al. | 709/330 |
| 2003/0086536 | A1 | 5/2003 | Saizberg | |
| 2006/0059557 | A1* | 3/2006 | Markham | G07C 9/00158 726/22 |
| 2007/0067845 | A1* | 3/2007 | Wiemer | G06F 21/577 726/25 |
| 2007/0250628 | A1 | 10/2007 | Katoh | |
| 2007/0287473 | A1 | 12/2007 | Dupray | |
| 2008/0262990 | A1* | 10/2008 | Kapoor | G06F 9/505 706/20 |
| 2008/0263671 | A1* | 10/2008 | Solino Testa | G06F 21/577 726/25 |
| 2010/0067542 | A1 | 3/2010 | Grenot | |
| 2010/0198807 | A1 | 8/2010 | Kuno | |
| 2010/0281248 | A1* | 11/2010 | Lockhart | G06F 11/3612 713/150 |
| 2010/0293616 | A1 | 11/2010 | Young | |
| 2012/0131668 | A1 | 5/2012 | Berg et al. | |
| 2013/0007887 | A1 | 1/2013 | Haviv et al. | |
| 2013/0055397 | A1 | 2/2013 | Amit et al. | |
| 2014/0282425 | A1* | 9/2014 | Zhao | G06F 11/3688 717/127 |
| 2014/0310714 | A1 | 10/2014 | Chan | |

FOREIGN PATENT DOCUMENTS

| | | |
|---|---|---|
| WO | 2006051013 A2 | 5/2006 |
| WO | 2013000083 A1 | 1/2013 |

OTHER PUBLICATIONS

Nadji et al., "Document Structure Integrity: A Robust Basis for Cross-Site Scripting Defense", NDSS Symposium 2009, 20 pages.

Wei et al., "Research on Mock Attack Testing for SQL Injection Vulnerability in Multi-Defense Level Web Applications", 2nd International Conference on Information Science and Engineering ICISE, 2010, pp. 1-5.

Weinberger et al., "A Systematic Analysis of XSS Sanitization in Web Application Frameworks", ESORICS'11 Proceedings of the 16th European conference on Research in computer security, pp. 150-171, 2011.

International Search Report and Written Opinion for International Application No. PCT/CN2014/087168; International Filing Date: Sep. 23, 2014; Date of Mailing Dec. 24, 2014; 11 pages.

U.S. Appl. No. 14/294,294; Non-Final Office Action; filed Jun. 3, 2014; Date Mailed: Apr. 10, 2015; 23 pages.

U.S. Appl. No. 14/294,294; Non-Final Office Action; filed Jun. 3, 2014; Date Mailed: Oct. 15, 2015; 36 pages.

Office Action Communication, U.S Appl. No. 14/294,294, pp. 1-9, Feb. 17, 2016.

Notice of Allowance Communication, U.S. Appl. No. 14/294,294, Apr. 14, 2016, pp. 1-14.

PCT International Preliminary Report on Patenability, International Application No. PCT/CN2014/087168, Dated Apr. 5, 2016, pp. 1-4.

* cited by examiner

SECURITY TESTING USING SEMANTIC MODELING

BACKGROUND

The present disclosure relates generally to security testing using semantic modeling and, more particularly, to efficiently testing vulnerabilities in software applications running over a networked environment.

Software applications that are executed in a networked computing environment, particularly Web applications, are subject to an increasing number of security attacks. Such security attacks take advantage of known or discoverable vulnerabilities in an application and infiltrate the underlying system. Injection attacks, such as cross-site scripting (XSS) and SQL injection (SQLi), are examples of security attacks that have become prevalent, leading to the evolution of tools for testing applications defense mechanisms against intrusion. IBM® AppScan Standard and Enterprise Edition or HP® WebInspect are two examples of such testing tools.

Typically, a testing tool operates by simulating a "naïve" attacker, where a list of tests for different types of vulnerabilities is defined. The testing tool then sends these tests to a target application by first exploring the application's interfaces (e.g., by running a standard crawler) and then mutating requests that were used during the crawling phase by embedding the test data (e.g., a payload) within them. For example, the tool may change a benign HTTP parameter in a GET request into a script to test for XSS vulnerabilities. The tool then analyzes the response from the target application or website to determine whether the attack has succeeded.

In an ideal scenario, the testing tool will try all possible tests and stops when an attack succeeds. However, the costs associated with sending certain tests to the application (e.g., HTTP requests with multiple payloads) are very high. Therefore, to retain reasonable performance, commercial testing tools (i.e., scanners) can reasonably attempt only a certain number of payloads per HTTP parameter.

SUMMARY

In accordance with one embodiment, machines, systems and methods for optimized testing of vulnerabilities in an application are provided. The method includes generating a first probe directed to determine whether an application is vulnerable to a first type of attack; analyzing one or more responses from the application based on the application responding to the first probe. In response to determining that the one or more responses from the application validate a first hypothesis about one or more vulnerabilities associated with the application, the method includes generating at least a second probe to further verify the first hypothesis. The second probe focuses on discovering additional details about the application's vulnerabilities to the first type of attack or a second type of attack.

In accordance with one or more embodiments, a system including one or more logic units is provided. The one or more logic units are configured to perform the functions and operations associated with the above-disclosed methods. In yet another embodiment, a computer program product including a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE SEVERAL VIEWS OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

In an exemplary embodiment, systems and methods are provided to optimize testing of vulnerabilities by converging on an appropriate payload, which can bypass all the defense measures of a website and expose vulnerabilities, using a small number of test trials.

Figure 1:
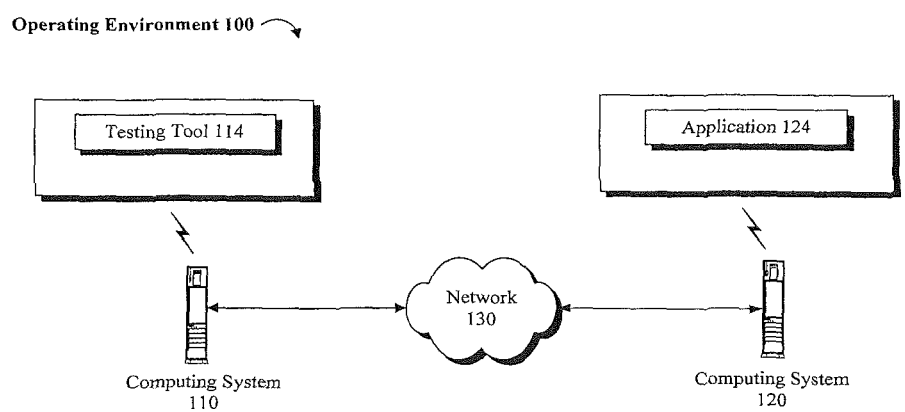
FIG. 1 illustrates an exemplary computing environment in accordance with an embodiment, wherein an application is tested for vulnerabilities.

Referring to FIG. 1, the systems and methods optimize testing of vulnerabilities in an application 124 (e.g., a Web application) by narrowing or focusing the testing into areas that may be determined as having high exposure to attack. In one embodiment, a series of probes are generated by a testing tool 114 to target the application 124 vulnerabilities, such that analyzing the application 124 responses to the probes may provide an understanding of the types of vulnerabilities that may expose the application 124 to attack.

As shown, testing tool 114 may be running as software code on a computing system 110 which communicates with a computing system 120 over a network 130. Network 130 may be a local area or wide area communications network, such as the Internet. Computing system 120 may be a server system such as a Web server on which application 124 is executed to respond to requests submitted by client systems or client software, and in a particular case, to respond to probes generated by testing tool 114.

Figure 2:
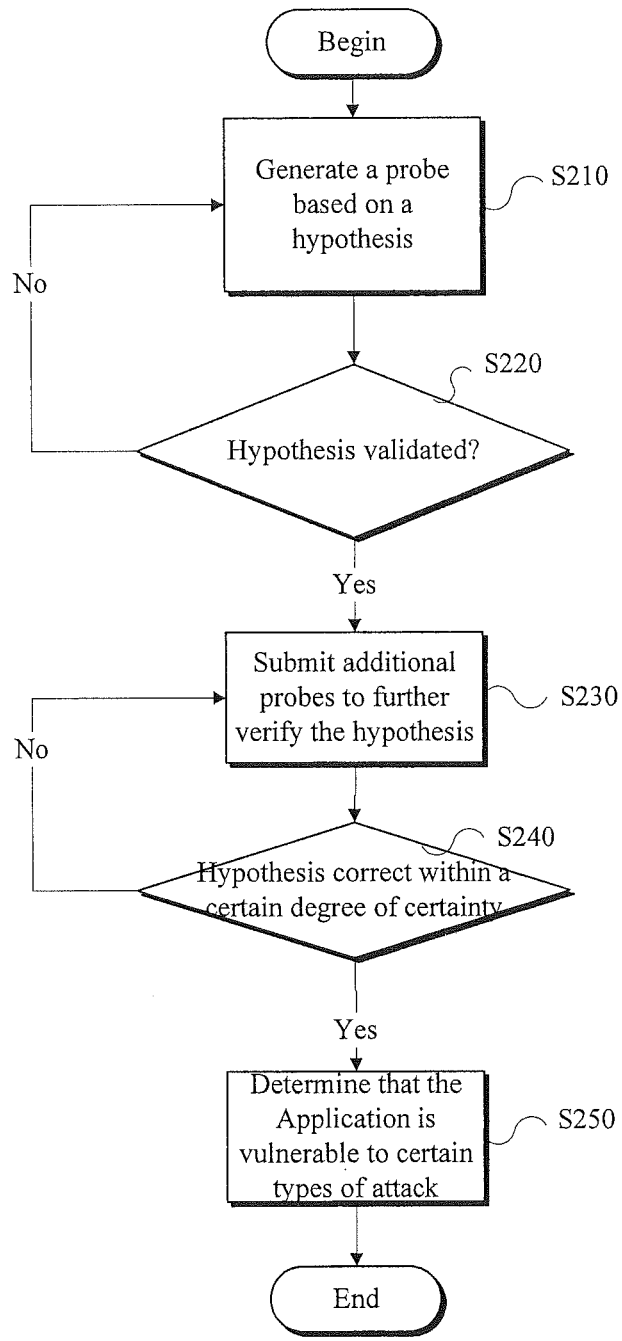
FIG. 2 is a flow diagram of an exemplary method for optimizing the testing for vulnerabilities in accordance with an embodiment.

Depending on implementation, the probes may be broad or generalized at the initial stages of testing and may become more focused or specific according to the targeted application 124 responses to the probes. Referring to FIG. 2, a first probe may be based on a first hypothesis that the target application 124 is vulnerable in a first area (S210). If the application 124 response or responses received by the testing tool 114 validate hypothesis (S220), additional probes may be submitted by testing tool 114 to application 114 to further verify whether the initial hypothesis (S230).

The additional probes, in one or more embodiments, may continue until it may be determined, for example, with a certain degree of certainty that the hypothesis is correct (S240). If the hypothesis is determined to be correct, then it may be deduced that, based on the hypothesis, the application 124 is likely vulnerable to certain types of attacks (S250). Accordingly, the testing may be focused on further attacks that are configured to expose the identified types of vulnerabilities.

The probes may be submitted in a systematic way to test whether several hypotheses about different vulnerabilities in the application 124 are correct. If multiple hypotheses are determined to be correct at a predefined level of certainty, for example, then it may be desirable to test more heavily along the areas with a higher level of certainty, particularly if the testing budget is limited. As such, the testing may be concentrated in areas that are determined to be more vulnerable.

The defense measures used by an application 124 may include a sanitization or a validation process, for example. A sanitizer may be used to apply a sanitization method that endorses user-provided input by mutating the input (e.g., by encoding the input in HTML or URL code). The sanitizer may map an input string to an output string based on a signature, for example. The signature may map an input string to a Boolean value that indicates whether the input string is admissible. The sanitizer may modify the value associated with a potentially malicious input string into a benign value in the output string.

In contrast to a sanitizer that modifies the input string, a validator may be utilized to perform a validation process to determine whether the input is non-malicious or, if malicious, whether the input is eligible for sanitization. For example, a validation process may be used to determine if an input value associated with a parameter (e.g., "name") provided to an application 124 contains numbers. If so, then the input may be rejected or sanitized to only include non-numeric characters, for example.

In one embodiment, constraints from an application's response may be analyzed by a test tool to rule out an application's vulnerability level. For example, if the test tool submits test data with the payload "script:alert( . . . )", but the response echoed from the application 124 excludes the parenthesis, i.e., "script:alert . . . ", then the test tool may assume that the application 124 is able to sanitize such payloads and choose not to send future tests that include "C under the assumption that the application 124 is not vulnerable to such types of attack.

In some scenarios, an application (e.g., a website) that is targeted by malicious probes may use one or more filtering mechanisms to defend against security attacks, as well as invalid inputs. For example, sanitizing expressions may be used that do not translate into character-based constraints on the input, and instead enforce global invariants. Such sanitizing expressions cannot be learned efficiently based on the response from the website, as provided in the following two examples: (1) the validator is regular expression \<(\w+)\> [^\<]+\</(\w+)", which filters HTML tags to protect against XSS vulnerabilities. This regular expression identifies HTML open and close tags. It returns an empty string in case of a match against the input parameter's value, and the original string otherwise. In this first example, there is no single character that is blocked by the sanitizer, but full XSS payloads are blocked. As a result, character-based constraints are futile in bypassing this sanitizer; and (2) the validator blocks all tags having JavaScript event handlers (e.g., onerror, onmousehover, etc). The regular expression in this case is "\<\w+.*on\w+\=". In this second example, a match against the input parameter's value yields an empty string. Otherwise, the original value is preserved. Here, too, we cannot make use of character-based learning, because the regular expression applies to the entire input string.

In some implementations, a so-called glass-box technique is used for transcending the limitations of character-based constraint learning. A glass-box analysis may not be possible in certain scenarios, for example, when there is no access to the code of the target application or website for either IP or technical reasons, or where the code is accessible, but the application is not amenable to changes in the deployment environment (e.g., if the application is already running), or if a testing tool 114 does not feature glass-box capabilities or does not fully support the application's code.

To overcome defense measures, such as those referred to above (e.g., regular expressions), a so-called black-box scheme may be used that utilizes heuristics, in accordance with one or more embodiments, to manage the challenge of detecting which defense measures are used by the target application or website based on a graph-search problem, for example. Depending on implementation, the graph may denote the different semantic alternatives for defending against a given attack and the structural connections between the different alternatives.

In one example embodiment, a security tool may be configured to interleave testing with probing toward converging on a defense strategy that is likely used by the target application and finding a bypass, if any. Probing may be used to guide the testing tool 114 toward a graph node, for example, denoting the likely defense strategy. Then the testing tool 114 may engage in testing. If testing fails consistently, then the testing tool 114 may switch back to probing, and so on, until either the attack succeeds or the testing budget is exhausted.

In the following, a detailed example of the black-box scheme in accordance with one embodiment is provided, with the caveat that the specific details are not to be construed to limit the broader scope of the claimed subject matter to the limited exemplary scenario provided below. In the case of HTML tags, for example, a target application may use a validator that rejects HTML tags with JavaScript event attributes. In such a case, the following technique may be implemented in accordance with one example embodiment: (1) test tool submits (e.g., in an initial probe) the input tag (i.e., a payload)<DummyTag>. If this same payload is reflected in the application's response to the probe, the probing process continues; (2) test tool submits (e.g., in a subsequent probe) an HTML tag with a nonexistent attribute, <DummyTag DummyAttr=test>. If this same payload is reflected in the application's response to the probe, the probing process continues; (3) test tool submits an HTML tag with a nonexistent attribute with the same prefix as a JavaScript event, the "on" prefix: <DummyTag onDummy=test>. In this example, if the response does not reflect the same payload, the probing process terminates.

In the above example, the testing tool 114 may move on to probing a different type of vulnerability, by having ruled out that the target application is protected by a defense mechanism (e.g., a sanitizer or a validator) that doesn't allow HTML tags with JavaScript event attributes. It is noteworthy that, in the above example, the probing does not cover specific regular expressions, in an attempt to find the exact regular expression used to protect the parameter, because such approach would be inefficient, if not infeasible. Instead, the focus is placed on a relatively small number of semantic distinctions between classes of sanitizers.

Accordingly, a test tool may be configure to submit probes that guide the testing tool 114 toward a semantic category associated with the sanitizers or validators used by a target application or website. Learning the general category of attacks, against which a sanitizer or validator protects against, enables the testing to be performed in an efficient and effective manner. As such, in accordance with one embodiment, the probing space is represented as a graph, $G=(V,E)$, where generally V represents one or more nodes and E represents one or more edges in the graph. A node "v" in V represents a possible defense strategy, and an edge $e=(v1,v2)$ in E is labeled with one or more probes p1 through pn, such that:

$v_1$ is a more restrictive defense measure than $v_2$; and
the success of one or more of the probe tests p, indicates that the less restrictive defense measure, $v_2$, may be employed.

1. Start from the unique root of G denoting the most restrictive case. Let u be that node.
2. Traverse the neighbors of u in a breadth-first manner.
3. For each edge $e=(u,v)$, attempt the probes corresponding to e.
   a. If one of the probes has succeeded, then let u=v. Return to step 2.
4. Test the defense strategy denoted by u.
   a. If one of the tests has succeeded, then break and report the vulnerability.
   b. Otherwise, if the testing budget has been exhausted:
      i. If u has a parent (i.e., u is not the root node), then set u to u's parent (through which we arrived at u), and return to step 2.
      ii. Otherwise, break and report that no vulnerability could be found.

Depending on implementation, a testing tool 114 may maintain a log of its interaction with the target application. Such log may capture semantic probing, as prescribed by the above algorithm. Moreover, payloads sent during testing may be reviewed to determine if the payloads are compatible with the probing information collected at the beginning of the scan.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
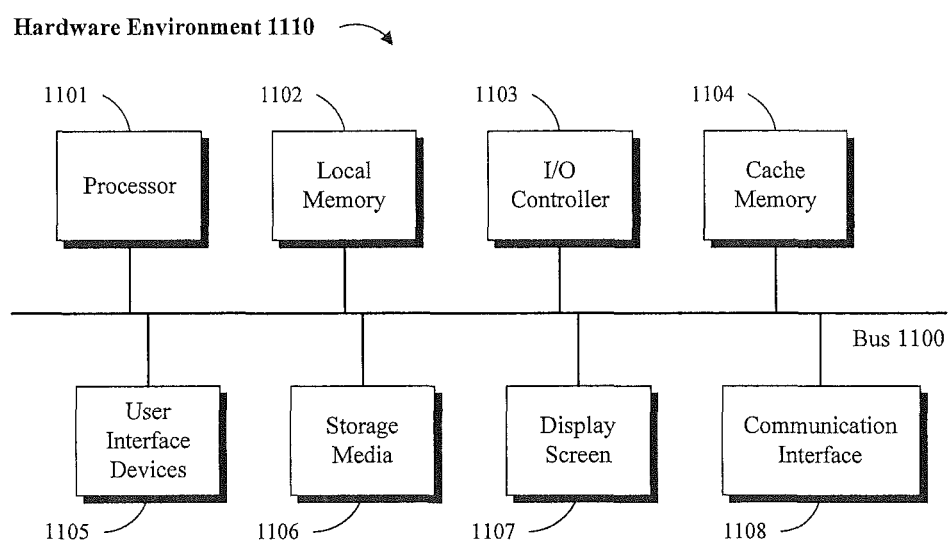
FIGS. 3A and 3B are block diagrams of hardware and software environments in which the disclosed systems and methods may operate, in accordance with an embodiment.
Figure 3B:
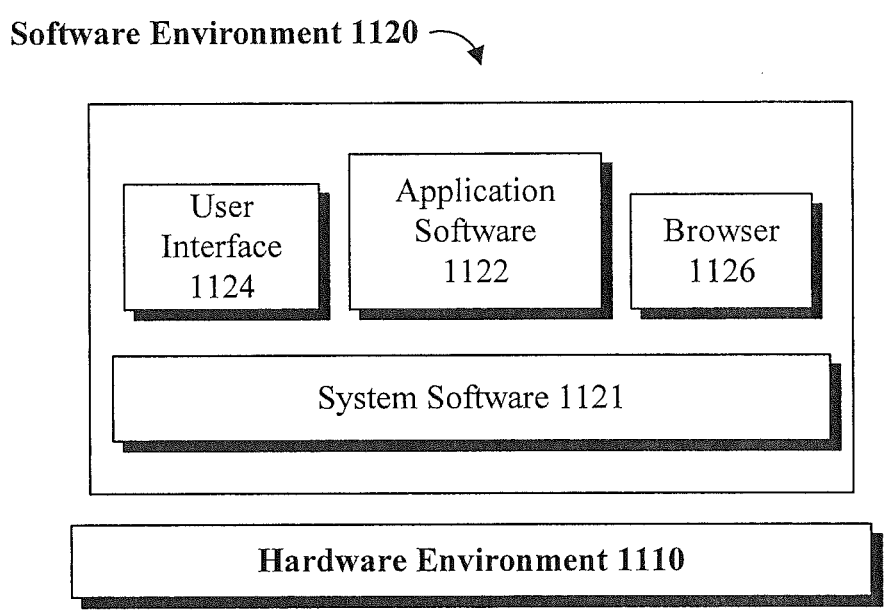

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A system for optimized testing of vulnerabilities in an application, the system comprising:

a memory having computer readable instructions stored therein; and a processor for executing the computer readable instructions, the computer readable instructions including:

performing vulnerability testing on a software application, comprising:

generating a first probe configured to determine whether the software application is vulnerable to a first type of attack, the generating comprising selecting the first probe from a list of tests, and embedding test data in a payload that simulates a particular type of attack on the software application, each of the tests from the list of tests simulating a different type of attack;

inputting the first probe to the software application;

analyzing one or more responses to the first probe received from the software application;

in response to determining that the one or more responses from the software application validate a first hypothesis that one or more vulnerabilities is associated with the software application, generating at least a second probe to further verify the first hypothesis, wherein the second probe is configured to discover additional details about the software application's vulnerabilities to the first type of attack;

inputting the second probe to the software application;

analyzing one or more responses to the second probe received from the software application;

determining an accuracy of the first hypothesis based on results of the analyzing the one or more responses to the second probe, the first hypothesis is determined to be accurate when an attack on the software application, as defined by the payload, is successful in exposing a vulnerability in the software application; and performing further testing of the software application as a function of the accuracy of the first hypothesis.

2. The system of claim 1, wherein one or more responses from the software application based on the software application responding to the second probe are analyzed to determine whether the first hypothesis is accurate, within a predetermined degree of certainty.

3. The system of claim 2, wherein upon determining that the first hypothesis is accurate within the predetermined degree of certainty, the software application is determined to be vulnerable to at least the first type of attack.

4. The system of claim 1, wherein a test tool is utilized to generate the first probe or the second probe targeting the software application.

5. The system of claim 2, wherein upon determining that the first hypothesis is not accurate within the predetermined degree of certainty, discontinuing any further probes for testing the software application with respect to the first type of attack.

6. The system of claim 1, wherein in response to determining that the one or more responses from the software application do not validate the first hypothesis that one or more vulnerabilities is associated with the software application, refraining from generating the second probe.

* * * * *